(12) United States Patent
Khlat (10) Patent No.: US 10,659,086 B2
(45) Date of Patent: May 19, 2020

(54) MULTI-MODE RADIO FREQUENCY CIRCUIT

(71) Applicant: Qorvo US, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 16/157,176

(22) Filed: Oct. 11, 2018

(65) Prior Publication Data
US 2019/0386686 A1    Dec. 19, 2019

Related U.S. Application Data

(60) Provisional application No. 62/684,433, filed on Jun. 13, 2018.

(51) Int. Cl.
*H04B 1/00* (2006.01)

(52) U.S. Cl.
CPC ..................... *H04B 1/005* (2013.01)

(58) Field of Classification Search
CPC .... H03F 2200/451; H03F 3/195; H03F 3/245; H03F 3/211; H03F 1/0227; H01F 38/14; H04B 1/0057; H04B 1/006; H04B 1/401
See application file for complete search history.

(56) References Cited

U.S. PATENT DOCUMENTS

| | | | | |
|---|---|---|---|---|
| 6,298,224 B1* | 10/2001 | Peckham | ............... | H04B 1/406 455/188.1 |
| 6,584,304 B1* | 6/2003 | Thomsen | ............... | H04B 1/005 455/188.1 |
| 2005/0088254 A1* | 4/2005 | Belk | ....................... | H03J 5/244 333/174 |
| 2006/0276158 A1* | 12/2006 | Okabe | ..................... | H04B 1/38 455/333 |
| 2007/0066245 A1* | 3/2007 | Snider | ................. | H04B 1/0057 455/78 |
| 2014/0235184 A1* | 8/2014 | Ichitsubo | ................ | H04B 1/38 455/101 |
| 2015/0249479 A1* | 9/2015 | Nobbe | ................... | H04B 17/12 455/77 |
| 2018/0109274 A1* | 4/2018 | Takenaka | .............. | H04B 1/403 |
| 2018/0343000 A1* | 11/2018 | Nosaka | .................... | H04B 1/00 |

(Continued)

*Primary Examiner* — Dung Hong
(74) *Attorney, Agent, or Firm* — Withrow & Terranova, P.L.L.C.

(57) ABSTRACT

A multi-mode radio frequency (RF) circuit is provided. The multi-mode RF circuit is configured to support simultaneous communication in a pair of different frequency bands via an output node(s) coupled to an RF front-end circuit. A switchable filter circuit is configured to communicate one RF signal in a selected frequency band, while a multi-band filter circuit(s) is configured to communicate second RF signal in other frequency bands outside the selected frequency band. The switchable filter circuit is preconfigured to present various inherent impedances against each of the other frequency bands. A switching circuit is provided between the switchable filter circuit and the output node(s). In various operation modes, the switching circuit is configured to selectively provide one of the various inherent impedances to the output node(s), thus helping to mitigate interference caused by any of the other frequency bands used to support simultaneous communication with the selected frequency band.

21 Claims, 7 Drawing Sheets

(56) References Cited

U.S. PATENT DOCUMENTS

| | | | |
|---|---|---|---|
| 2019/0097606 A1* | 3/2019 | Nosaka | H03H 9/6403 |
| 2019/0115947 A1* | 4/2019 | Nosaka | H04B 1/50 |
| 2019/0181907 A1* | 6/2019 | Pfann | H03H 9/02015 |
| 2019/0214959 A1* | 7/2019 | Nosaka | H03H 1/0007 |
| 2019/0222199 A1* | 7/2019 | Nosaka | H04B 1/18 |

* cited by examiner

MULTI-MODE RADIO FREQUENCY CIRCUIT

RELATED APPLICATIONS

This application claims the benefit of provisional patent application Ser. No. 62/684,433, filed Jun. 13, 2018, the disclosure of which is hereby incorporated herein by reference in its entirety.

FIELD OF THE DISCLOSURE

The technology of the disclosure relates generally to a radio frequency (RF) front-end circuit.

BACKGROUND

Mobile communication devices have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

A mobile communication device may be configured to support carrier aggregation, in which the mobile communication device simultaneously communicates (transmits and/or receives) a pair of radio frequency (RF) signals in a pair of different frequency bands. For example, the mobile communication device can be configured to communicate one RF signal in a selected frequency band (e.g., long-term evolution (LTE) band 41), while simultaneously communicating second RF signal in one of other frequency bands (e.g., LTE band 1, 25, 30, 40, or 66).

In one possible configuration, the mobile communication device may include a filter circuit specifically for LTE band 41 and a multi-band filter circuit(s) for the other LTE bands. Accordingly, the mobile communication device can be dynamically configured to support carrier aggregation between LTE band 41 and any of the other LTE bands. In this regard, to help mitigate interferences between LTE band 41 and the other LTE bands, the LTE band 41 filter circuit needs to present higher and less lossy impedance to each of the other LTE bands located outside LTE band 41. Hereinafter, impedance presented by a filter circuit of a selected frequency band against any other frequency band outside the selected frequency band is referred to as "out-of-band" impedance.

Notably, the LTE band 41 filter circuit may need to present different out-of-band impedance for each of the other LTE bands. In a conventional approach, the LTE band 41 filter circuit may be coupled to an adjustable capacitor(s), which can be adjusted to influence the out-of-band impedance presented by the LTE band 41 filter circuit. However, such a conventional approach may be ineffective in providing the out-of-band impedances at the higher and less lossy level to enable sufficient interference mitigation during carrier aggregation, particularly when a pair of frequency bands involved in the carrier aggregation operation is close to each other.

SUMMARY

Embodiments of the disclosure relate to a multi-mode radio frequency (RF) circuit. In examples discussed herein, the multi-mode RF circuit is configured to support simultaneous communication (e.g., carrier aggregation) in a pair of different frequency bands via an output node(s) coupled to an RF front-end circuit. In a non-limiting example, a switchable filter circuit is configured to communicate one RF signal in a selected frequency band, while a multi-band filter circuit(s) is configured to communicate second RF signal in other frequency bands outside the selected frequency band. The switchable filter circuit is preconfigured to present various inherent impedances against each of the other frequency bands communicated by the multi-band filter circuit. The multi-mode RF circuit includes a switching circuit coupled between the switchable filter circuit and the output node(s). In various operation modes (e.g., different combinations between the selected frequency band and any of the other frequency bands), the switching circuit is configured to selectively provide one of the various inherent impedances to the output node(s), thus helping to mitigate interference caused by any of the other frequency bands used to support simultaneous communication with the selected frequency band.

In one aspect, a multi-mode RF circuit is provided. The multi-mode RF circuit includes a switchable filter circuit. The switchable filter circuit is configured to pass an RF signal in a first frequency band and present first inherent impedance outside the first frequency band at a first signal node. The switchable filter circuit is also configured to pass the RF signal in a second frequency band and present second inherent impedance outside the second frequency band at a second signal node. The multi-mode RF circuit also includes a switching circuit coupled to an RF front-end circuit via at least one output node. The switching circuit includes a first input node coupled to the first signal node and a second input node coupled to the second signal node. The multi-mode RF circuit also includes a control circuit. The control circuit is configured to, in a first mode, couple the first input node to the at least one output node to communicate the RF signal in the first frequency band via the at least one output node and present the first inherent impedance at the at least one output node. The control circuit is also configured to, in a second mode, couple the second input node to the at least one output node to communicate the RF signal in the second frequency band via the at least one output node and present the second inherent impedance at the at least one output node.

In another aspect, a multi-mode RF circuit is provided. The multi-mode RF circuit includes a switchable filter circuit configured to pass an RF signal in a number of frequency bands and present a number of inherent impedances outside the number of frequency bands at a number of signal nodes. The multi-mode RF circuit also includes a switching circuit coupled to an RF front-end circuit via at least one output node and comprising a number of input nodes coupled to the number of signal nodes. The multi-mode RF circuit also includes a control circuit. The control circuit is configured to, in a first mode, couple a first input node among the number of input nodes to the at least one output node to communicate the RF signal in a first frequency band among the number of frequency bands via the at least one output node and present a first inherent impedance among the number of inherent impedances at the at least one output node. The control circuit is also configured to, in a second mode, couple a second input node among the number of input nodes to the at least one output node to communicate the RF signal in a second frequency band among the number of frequency bands via the at least one output node and present a second inherent impedance among the number of inherent impedances at the at least one output node.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to a multi-mode radio frequency (RF) circuit. In examples discussed herein, the multi-mode RF circuit is configured to support simultaneous communication (e.g., carrier aggregation) in a pair of different frequency bands via an output node(s) coupled to an RF front-end circuit. In a non-limiting example, a switchable filter circuit is configured to communicate one RF signal in a selected frequency band, while a multi-band filter circuit(s) is configured to communicate second RF signal in other frequency bands outside the selected frequency band. The switchable filter circuit is preconfigured to present various inherent impedances against each of the other frequency bands communicated by the multi-band filter circuit. The multi-mode RF circuit includes a switching circuit coupled between the switchable filter circuit and the output node(s). In various operation modes (e.g., different combinations between the selected frequency band and any of the other frequency bands), the switching circuit is configured to selectively provide one of the various inherent impedances to the output node(s), thus helping to mitigate interference caused by any of the other frequency bands used to support simultaneous communication with the selected frequency band.

Figure 1:
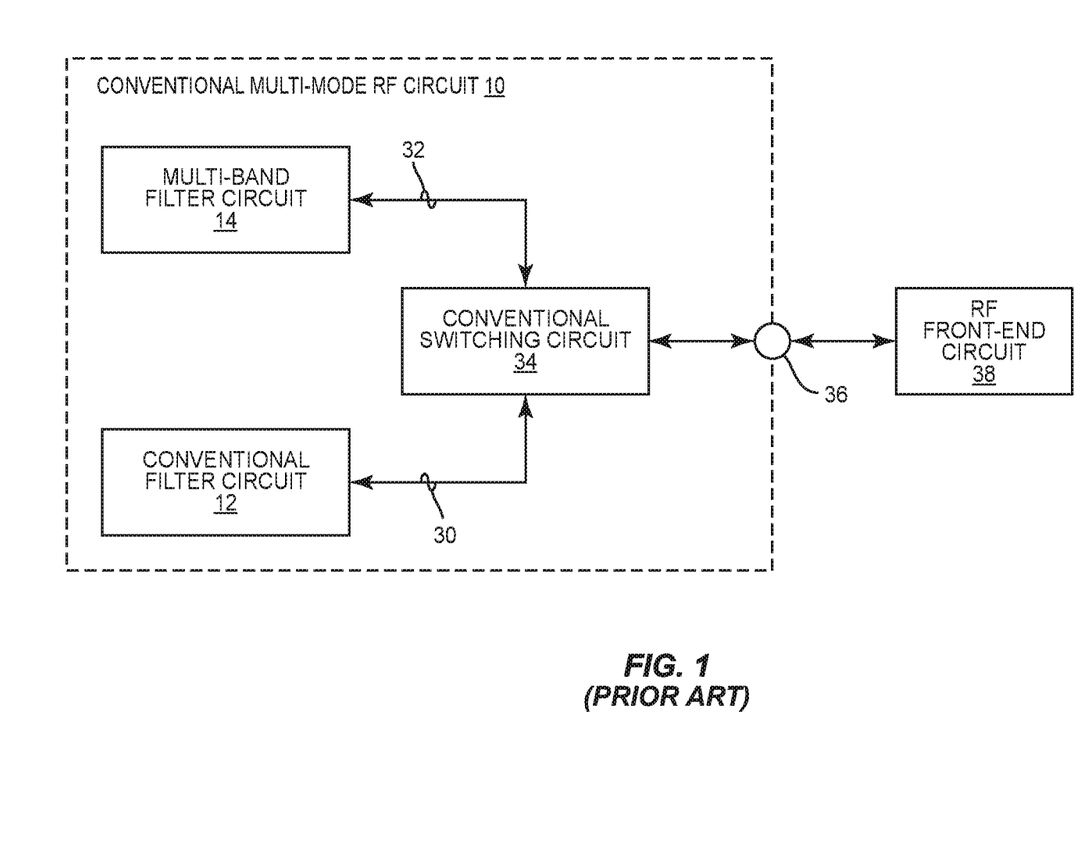
FIG. 1 is a schematic diagram of an exemplary conventional multi-mode radio frequency (RF) circuit configured to support simultaneous communication (e.g., carrier aggregation) in a pair of different frequency bands.
Figure 2:
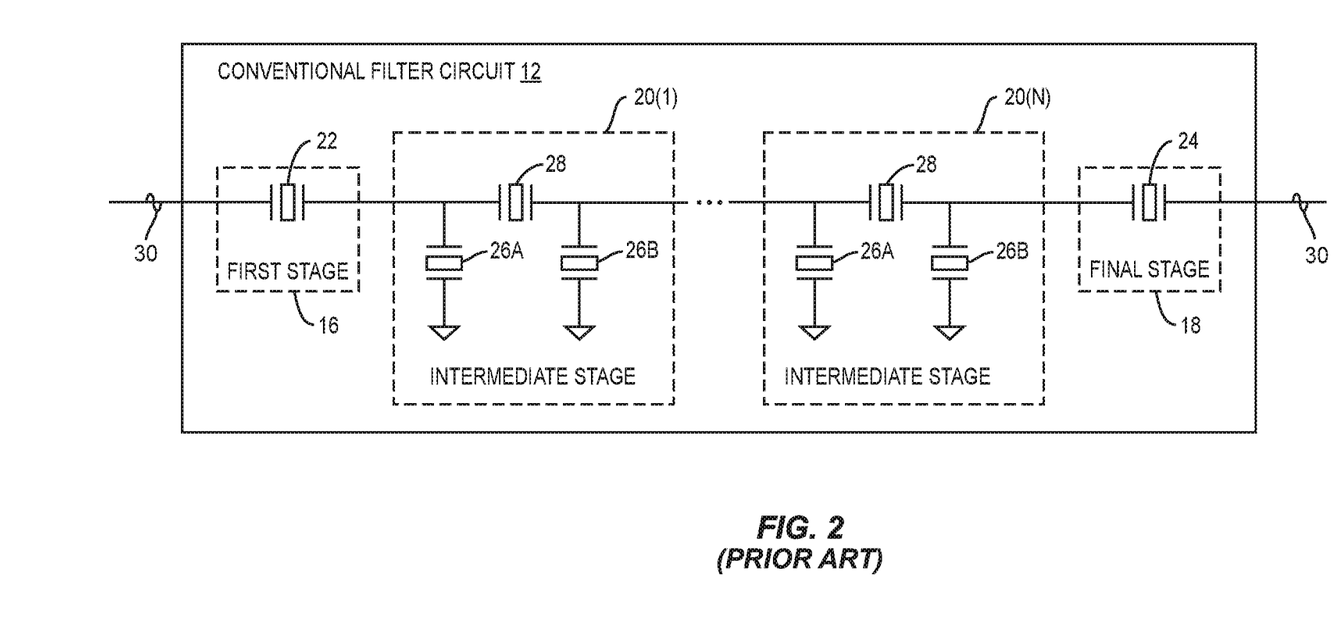
FIG. 2 is a schematic diagram providing an exemplary illustration of a conventional filter circuit included in the conventional multi-mode RF circuit of FIG. 1.

Before discussing the multi-mode RF circuit of the present disclosure, a brief overview of a conventional multi-mode RF circuit and a conventional filter circuit used in the conventional multi-mode RF circuit is first provided with reference to FIGS. 1 and 2. The discussion of specific exemplary aspects of an multi-mode RF circuit according to the present disclosure starts below with reference to FIG. 3.

FIG. 1 is a schematic diagram of an exemplary conventional multi-mode RF circuit 10 configured to support simultaneous communication (e.g., carrier aggregation) in a pair of different frequency bands. The conventional multi-mode RF circuit 10 includes a conventional filter circuit 12 and a multi-band filter circuit 14. The conventional filter circuit 12 may be an acoustic resonator circuit as illustrated in FIG. 2.

In this regard, FIG. 2 is a schematic diagram providing an exemplary illustration of the conventional filter circuit 12 of FIG. 1. The conventional filter circuit 12 includes a first stage 16, a final stage 18, and one or more intermediate stages 20(1)-20(N). The intermediate stages 20(1)-20(N) are provided in series between the first stage 16 and the final stage 18.

The first stage 16 includes a signal acoustic resonator 22, which is the only acoustic resonator in the first stage 16. The final stage 18 includes a signal acoustic resonator 24, which is the only acoustic resonator in the final stage 18. Each of the intermediate stages 20(1)-20(N) includes a pair of shunt acoustic resonators 26A, 26B and a signal acoustic resonator 28. The conventional filter circuit 12 is configured to pass an RF signal 30 in a defined frequency band in association with inherent impedance (e.g., capacitance impedance) determined primarily by the signal acoustic resonator 24 in the final stage 18.

With reference back to FIG. 1, the conventional filter circuit 12 is configured to pass the RF signal 30 in the defined frequency band, which can be long-term evolution (LTE) band 41, for example. The multi-band filter circuit 14 may include a number of filter circuits configured to pass a second RF signal 32 in a number of other frequency bands (e.g., LTE band 1, 3, 25, 30, 40, 66, etc.), respectively.

The conventional multi-mode RF circuit 10 includes a conventional switching circuit 34. The conventional multi-mode RF circuit 10 can be configured to operate in various carrier aggregation modes, in which the RF signal 30 and the second RF signal 32 are communicated simultaneously in the defined frequency band and any one of the other frequency bands, respectively. In this regard, the conventional switching circuit 34 couples the conventional filter circuit 12 and one of the filter circuits in the multi-band filter circuit 14 to an output node 36. Accordingly, the RF signal 30 and the second RF signal 32 can be communicated simultaneously via an RF front-end circuit 38.

Given that both the RF signal 30 in the defined frequency band and the second RF signal 32 in any of the other frequency bands converge at the output node 36, it is necessary to present higher and less lossy out-of-band impedance against each of the other frequency bands at the output node 36. Moreover, the out-of-band impedance may be different for each of the other frequency bands.

As mentioned earlier in FIG. 2, the conventional filter circuit 12 is configured to pass the RF signal 30 in the defined frequency band in association with the inherent impedance determined primarily by the signal acoustic resonator 24 in the final stage 18. As such, it may be difficult for the conventional filter circuit 12 to present different impedances against each of the other frequency bands. Although it may be possible to include adjustable capacitors in the conventional switching circuit 34 to present additional and variable impedance at the output node 36, such approach may be ineffective in providing the out-of-band impedances at a desirable level to enable sufficient interference mitigation during carrier aggregation, particularly when the RF signal 30 and the second RF signal 32 are communicated in closely located frequency bands. Hence, it may be desirable to optimize the conventional filter circuit 12 to inherently generate variable out-of-band impedances against each of the other frequency bands.

Figure 3:
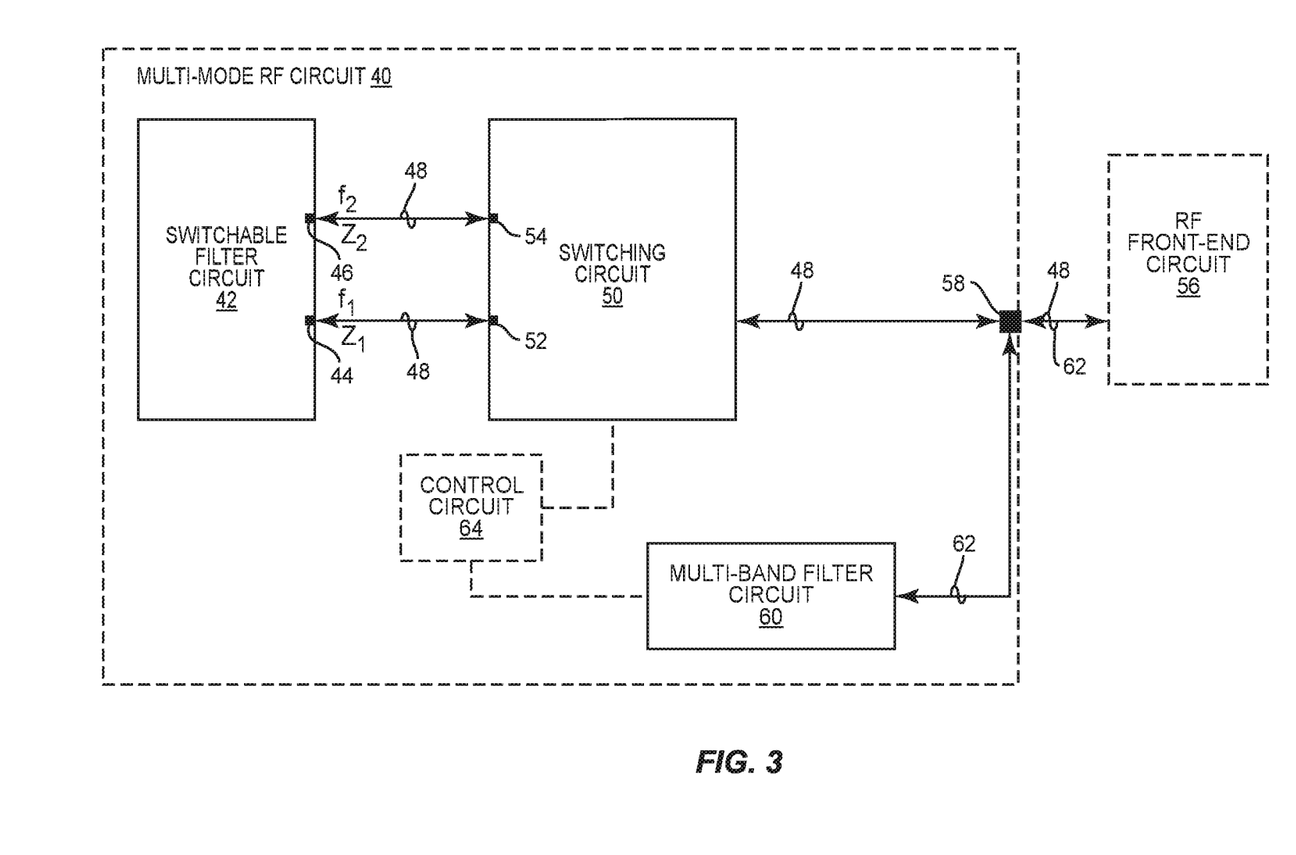
FIG. 3 is a schematic diagram of an exemplary multi-mode RF circuit configured to support simultaneous communication (e.g., carrier aggregation)

In this regard, FIG. 3 is a schematic diagram of an exemplary multi-mode RF circuit 40 configured to support simultaneous communication (e.g., carrier aggregation). The multi-mode RF circuit 40 includes a switchable filter circuit 42, which includes a first signal node 44 and a second signal node 46. The switchable filter circuit 42 is configured to pass an RF signal 48 in a first frequency band $f_1$ and present a first inherent impedance $Z_1$ outside the first frequency band $f_1$ at the first signal node 44. The switchable filter circuit 42 is also configured to pass the RF signal 48 in a second frequency band $f_2$ and present a second inherent impedance $Z_2$ outside the second frequency band $f_2$ at the second signal node 46. Notably, the first frequency band $f_1$, the second frequency band $f_2$, the first inherent impedance $Z_1$, and the second inherent impedance $Z_2$ are provided in FIG. 3 as non-limiting examples. It should be appreciated that the switchable filter circuit 42 can be configured to pass the RF signal 48 in additional frequency bands and present additional inherent impedances as needed.

The multi-mode RF circuit 40 includes a switching circuit 50. The switching circuit 50 includes a first input node 52 and a second input node 54 coupled to the first signal node 44 and the second signal node 46, respectively. The switching circuit 50 is coupled to an RF front-end circuit 56 via at least one output node 58.

The multi-mode RF circuit 40 may include a multi-band filter circuit 60 coupled to the output node 58. The multi-band filter circuit 60 may include a number of filter circuits (not shown) configured to pass a second RF signal 62 in a number of other frequency bands outside the first frequency band $f_1$ and the second frequency band $f_2$. In a non-limiting example, a frequency band is considered as being outside another frequency band(s) when the frequency band does not overlap with the other frequency band(s). The second RF signal 62 converges with the RF signal 48 at the output node 58. In this regard, the multi-mode RF circuit 40 can be configured to support simultaneous communication in different operation modes (e.g., carrier aggregation) based on different combinations between one of the first frequency band $f_1$ and the second frequency band $f_2$ supported by the switchable filter circuit 42 and any one of the other frequency bands supported by the multi-band filter circuit 60.

Given that the RF signal 48 and the second RF signal 62 converge at the output node 58, it may be necessary to present out-of-band impedances against each of the other frequency bands supported by the multi-band filter circuit 60 at the output node 58. In this regard, the switchable filter circuit 42 presents the first inherent impedance $Z_1$ and the second inherent impedance $Z_2$ at the first signal node 44 and the second signal node 46 as out-of-band impedances against at least a pair of the other frequency bands supported by the multi-band filter circuit 60.

The multi-mode RF circuit 40 may include a control circuit 64, which can be a microprocessor, a microcontroller, or a field-programmable gate array (FPGA) for example.

The control circuit 64 is coupled to the switching circuit 50 and the multi-band filter circuit 60 and configured to support the different operation modes. For example, the control circuit 64 can be configured to operate in at least a first mode or a second mode. Specifically, in the first mode, the control circuit 64 is configured to couple the first input node 52 to the output node 58 to communicate the RF signal 48 in the first frequency band $f_1$ via the output node 58 and present the first inherent impedance $Z_1$ at the output node 58. Concurrently, the control circuit 64 couples one of the filter circuits in the multi-band filter circuit 60 to the output node 58 to communicate the second RF signal 62 outside the first frequency band $f_1$. In this regard, the first inherent impedance $Z_1$ is present at the output node 58 as an out-of-band impedance to help mitigate potential interference between the RF signal 48 and the second RF signal 62.

Similarly, in the second mode, the control circuit 64 is configured to couple the second input node 54 to the output node 58 to communicate the RF signal 48 in the second frequency band $f_2$ via the output node 58 and present the second inherent impedance $Z_2$ at the output node 58. Concurrently, the control circuit 64 couples one of the filter circuits in the multi-band filter circuit 60 to the output node 58 to communicate the second RF signal 62 outside the second frequency band $f_2$. In this regard, the second inherent impedance $Z_2$ is present at the output node 58 as an out-of-band impedance to help mitigate potential interference between the RF signal 48 and the second RF signal 62.

In one non-limiting example, the first frequency band $f_1$ can be identical to the second frequency band $f_2$, while the first inherent impedance $Z_1$ is different from the second inherent impedance $Z_2$. In one non-limiting example, the first frequency band $f_1$ can be different from the second frequency band $f_2$, while the first inherent impedance $Z_1$ is identical to the second inherent impedance $Z_2$.

By configuring the switchable filter circuit 42 to generate the first inherent impedance $Z_1$, which is different from the second inherent impedance $Z_2$, and coupling the first inherent impedance $Z_1$ or the second inherent impedance $Z_2$ to the output node 58, it may be possible to dynamically and flexibly provide sufficient out-of-band impedances at the output node 58 against each of the other frequency bands supported by the multi-band filter circuit 60. As a result, the multi-mode RF circuit 40 may support simultaneous communication (e.g., carrier aggregation) with reduced interference and therefore improved performance.

In a non-limiting example, the switchable filter circuit 42 can be provided as an acoustic filter circuit. In this regard, FIG. 4 is a schematic diagram providing an exemplary high-level illustration of the switchable filter circuit 42 of FIG. 3.

The switchable filter circuit 42 includes a first stage 66, a final stage 68, and one or more intermediate stages 70(1)-70(M). The intermediate stages 70(1)-70(M) are provided in series between the first stage 66 and the final stage 68. As discussed in detail in FIGS. 5-6, the final stage 68 differs the final stage 18 of FIG. 2 in that the final stage 68 is configured to include at least two acoustic resonators. Further, as discussed in FIG. 7, the first stage 66 also differs the first stage 16 of FIG. 2 in that the first stage 66 is also configured to include at least two acoustic resonators.

Figure 4:
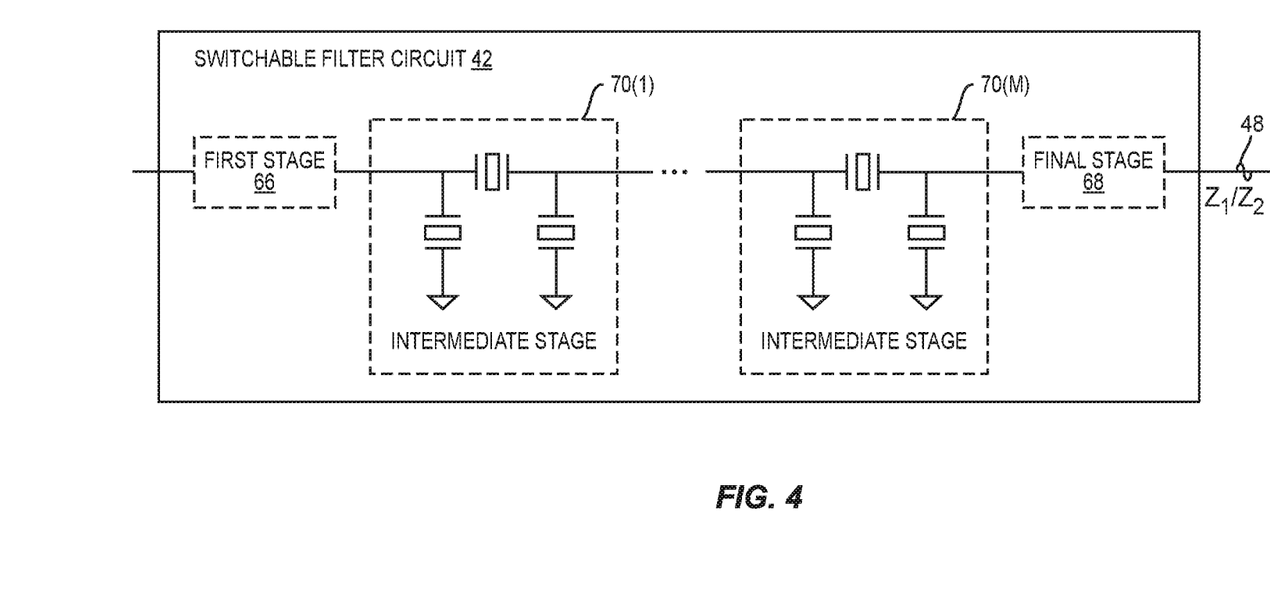
FIG. 4 is a schematic diagram providing an exemplary high-level illustration of a switchable filter circuit provided in the multi-mode RF circuit of FIG. 3.
Figure 5:
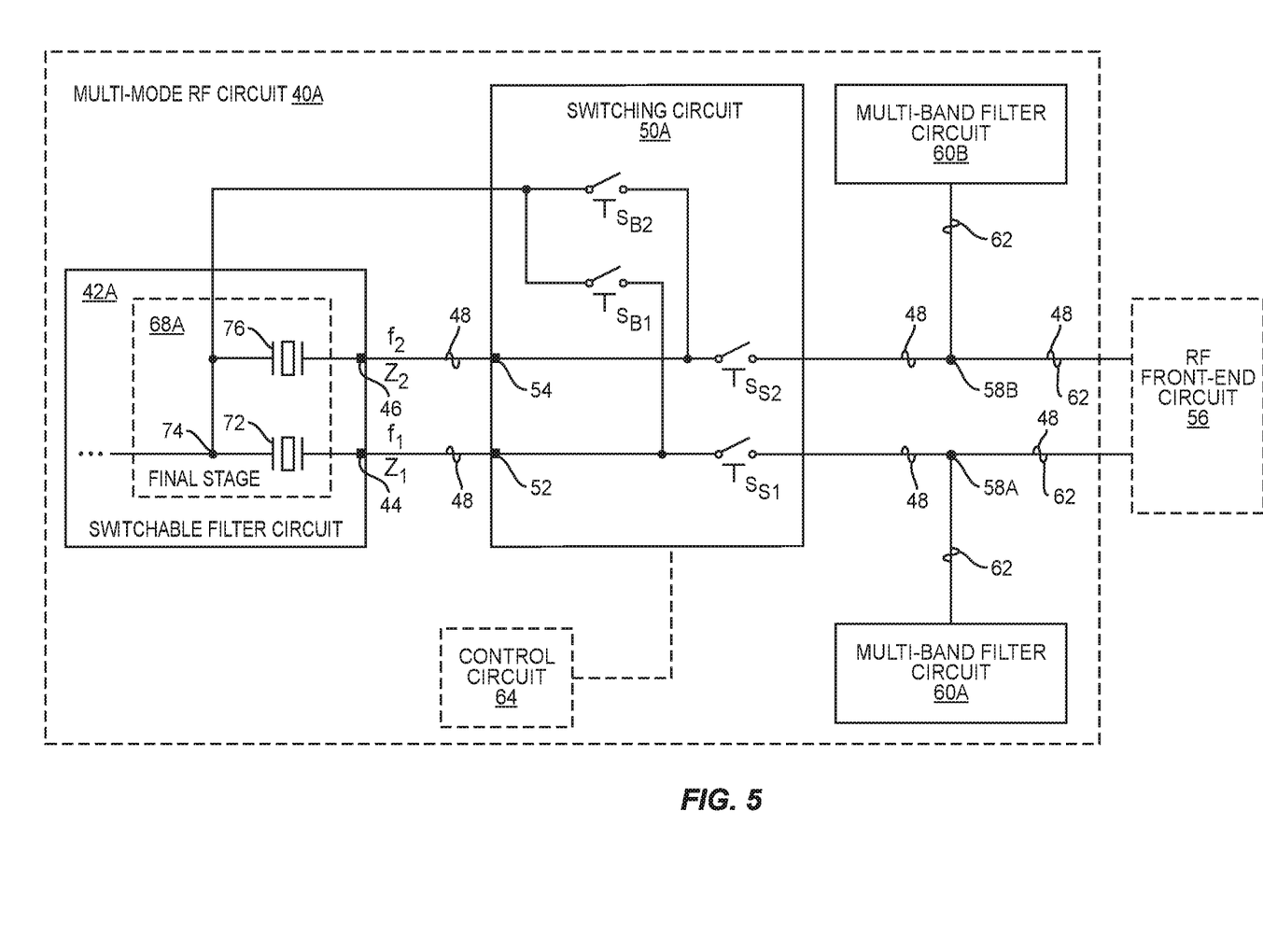
FIG. 5 is a schematic diagram of an exemplary multi-mode RF circuit configured according to one embodiment of the present disclosure to support simultaneous communication (e.g., carrier aggregation)

FIG. 5 is a schematic diagram of an exemplary multi-mode RF circuit 40A configured according to one embodiment of the present disclosure to support simultaneous communication (e.g., carrier aggregation). Common elements between FIGS. 3, 4, and 5 are shown therein with common element numbers and will not be re-described herein.

The multi-mode RF circuit 40A includes a switchable filter circuit 42A configured according to a similar typology as the switchable filter circuit 42 of FIG. 4. In this regard, the switchable filter circuit 42A includes the first stage 66 and the intermediate stages 70(1)-70(M) of FIG. 4 (not shown). The switchable filter circuit 42A includes a final stage 68A corresponding to the final stage 68 of FIG. 4.

The final stage 68A includes a first acoustic resonator 72 coupled between a common node 74 and the first signal node 44. The final stage 68A includes a second acoustic resonator 76 coupled between the common node 74 and the second signal node 46, in parallel to the first acoustic resonator 72. The switchable filter circuit 42A can be configured to pass the RF signal 48 in additional frequency bands and present additional inherent impedances as needed. In this regard, the final stage 68A of the switchable filter circuit 42A can include additional acoustic resonators coupled between the common node 74 and additional signal outputs.

The switching circuit 50A is coupled to the RF front-end circuit 56 via a first output node 58A and a second output node 58B. The switching circuit 50A includes a first signal switch $S_{S1}$ and a second signal switch $S_{S2}$. The first signal switch $S_{S1}$ is coupled between the first input node 52 and the first output node 58A. The second signal switch $S_{S2}$ is coupled between the second input node 54 and the second output node 58B.

In a non-limiting example, the first signal switch $S_{S1}$ and the second signal switch $S_{S2}$ can be provided as microelectromechanical systems (MEMS) switches or other suitable types of switches. The MEMS switches (e.g., contact MEMS switches) may be preferable because an MEMS switch can offer better figure of merit (FOM), which is defined as a multiplication of an on-resistance ($R_{ON}$) and an off-capacitance ($C_{OFF}$) of the MEMS switch (FOM=$R_{ON}$× $C_{OFF}$), than conventional switches. The MEMS switch presents the $R_{ON}$ and the $C_{OFF}$ in response to the MEMS switch being closed and opened, respectively. In a non-limiting example, the $R_{ON}$ and the $C_{OFF}$ of an MEMS switch can be less than 0.6 Ohms (<0.6Ω) and 64 femto-Farads (<64 fF), respectively. In a way, the better FOM offered by the MEMS switches makes it possible to include more than one acoustic resonator in the final stage 68A of the switchable filter circuit 42A.

In the first mode, the control circuit 64 is configured to close the first signal switch $S_{S1}$ and open the second signal switch $S_{S2}$. Accordingly, the first inherent impedance $Z_1$ and the $R_{ON}$ of the first signal switch $S_{S1}$ present a first combined impedance at the first output node 58A and the second inherent impedance $Z_2$ and the $C_{OFF}$ of the second signal switch $S_{S2}$ present a second combined impedance at the second output node 58B. Given that the second signal switch $S_{S2}$ is an MEMS switch and the $C_{OFF}$ is less than 64 fF, the second combined impedance may be dominated by the second inherent impedance $Z_2$. Concurrently, the control circuit 64 can couple a first multi-band filter circuit 60A to the first output node 58A, thus allowing the multi-mode RF circuit 40A to support simultaneous communication (e.g., carrier aggregation) based on the first frequency band $f_1$ and one of the frequency bands supported by the first multi-band filter circuit 60A.

In the second mode, the control circuit 64 is configured to open the first signal switch $S_{S1}$ and close the second signal switch $S_{S2}$. Accordingly, the first inherent impedance $Z_1$ and the $C_{OFF}$ of the first signal switch $S_{S1}$ present a first combined impedance at the first output node 58A and the second inherent impedance $Z_2$ and the $R_{ON}$ of the second signal switch $S_{S2}$ present a second combined impedance at the second output node 58B. Given that the first signal switch $S_{S1}$ is an MEMS switch and the $C_{OFF}$ is less than 64 fF, the first combined impedance may be dominated by the first inherent impedance $Z_1$. Concurrently, the control circuit 64 can couple a second multi-band filter circuit 60B to the second output node 58B, thus allowing the multi-mode RF circuit 40A to support simultaneous communication (e.g., carrier aggregation) based on the second frequency band $f_2$ and one of the frequency bands supported by the second multi-band filter circuit 60B.

Notably, in the first mode, the second combined impedance is presented as a parallel impedance to the first impedance, which may negatively impact the out-of-band impedance at the first output node 58A. Similarly, in the second mode, the first combined impedance is presented as a parallel impedance to the second impedance, which may negatively impact the out-of-band impedance at the second output node 58B. Given that the first combined impedance and the second combined impedance are dominated by the first inherent impedance $Z_1$ and the second inherent impedance $Z_2$, respectively, it may be desirable to mitigate impacts caused by the second inherent impedance $Z_2$ and the first inherent impedance $Z_1$ in the first mode and the second mode, respectively.

In this regard, the switching circuit 50A is configured to further include a first bypass switch $S_{B1}$ and a second bypass switch $S_{B2}$. The first bypass switch $S_{B1}$ is coupled between the common node 74 and the first signal switch $S_{S1}$. The second bypass switch $S_{B2}$ is coupled between the common node 74 and the second signal switch $S_{S2}$. In a non-limiting example, the first bypass switch $S_{B1}$ and the second bypass switch $S_{B2}$ are provided as MEMS switches, but with smaller footprints than the first signal switch $S_{S1}$ and the second signal switch $S_{S2}$. Like the first signal switch $S_{S1}$ and the second signal switch $S_{S2}$, the first bypass switch $S_{B1}$ and the second bypass switch $S_{B2}$ can also offer better FOM than conventional switches. In a non-limiting example, the $R_{ON}$ and the $C_{OFF}$ of the first bypass switch $S_{B1}$ and the second bypass switch $S_{B2}$ can be between 1-3Ω and less than 64 fF, respectively.

As mentioned earlier, the final stage 68A of the switchable filter circuit 42A can include additional acoustic resonators and the switching circuit 50A may include additional signal switches coupled between additional input nodes and additional output nodes. In this regard, the switching circuit 50A may include additional bypass switches coupled between the common node 74 and the additional signal switches.

In the first mode, the control circuit 64 is further configured to close the second bypass switch $S_{B2}$ and open the first bypass switch $S_{B1}$. Accordingly, the $R_{ON}$ of the second bypass switch $S_{B2}$ replaces the second inherent impedance $Z_2$ in the second combined impedance. In other words, the second combined impedance includes the $R_{ON}$ of the second bypass switch $S_{B2}$ and the $C_{OFF}$ of the second signal switch $S_{S2}$. Given that the $R_{ON}$ of the second bypass switch $S_{B2}$ can be significantly smaller than the second inherent impedance $Z_2$ caused by the second acoustic resonator 76, it may be possible to mitigate the negative impact of the second combined impedance in the first mode.

Likewise, in the second mode, the control circuit 64 is further configured to open the second bypass switch $S_{B2}$ and close the first bypass switch $S_{B1}$. Accordingly, the $R_{ON}$ of the first bypass switch $S_{B1}$ replaces the first inherent impedance $Z_1$ in the first combined impedance. In other words, the first combined impedance includes the $R_{ON}$ of the first bypass switch $S_{B1}$ and the $C_{OFF}$ of the first signal switch $S_{S1}$. Given that the $R_{ON}$ of the first bypass switch $S_{B1}$ can be significantly smaller than the first inherent impedance $Z_1$ caused by the first acoustic resonator 72, it may be possible to mitigate the negative impact of the first combined impedance in the second mode.

Figure 6:
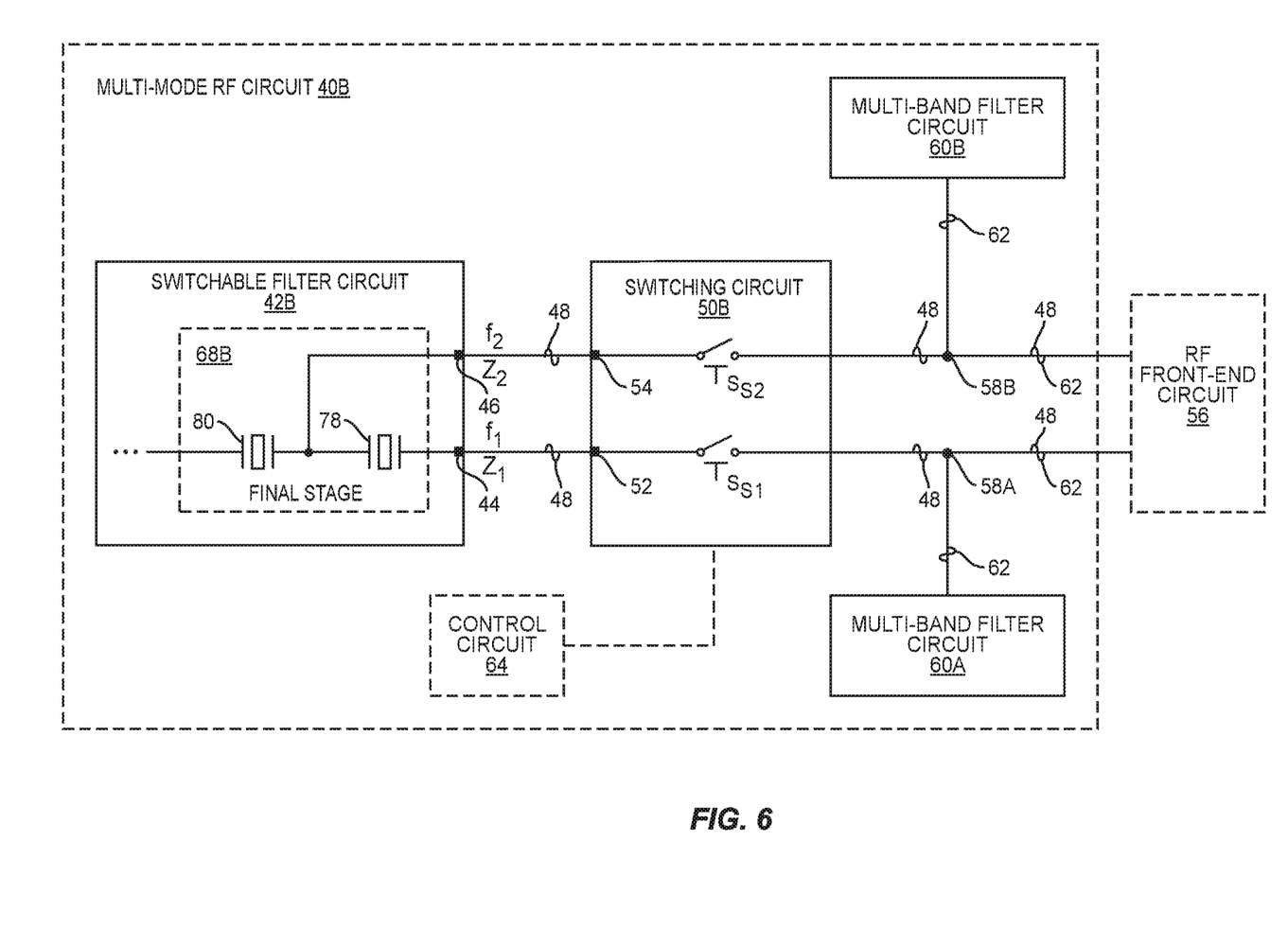
FIG. 6 is a schematic diagram of an exemplary multi-mode RF circuit configured according to another embodiment of the present disclosure to support simultaneous communication (e.g., carrier aggregation)

FIG. 6 is a schematic diagram of an exemplary multi-mode RF circuit 40B configured according to one embodiment of the present disclosure to support simultaneous communication (e.g., carrier aggregation). Common elements between FIGS. 5 and 6 are shown therein with common element numbers and will not be re-described herein.

The multi-mode RF circuit 40B includes a switchable filter circuit 42B configured according to a similar typology as the switchable filter circuit 42 of FIG. 4. In this regard, the switchable filter circuit 42B includes the first stage 66 and the intermediate stages 70(1)-70(M) of FIG. 4 (not shown). The switchable filter circuit 42B includes a final stage 68B corresponding to the final stage 68 of FIG. 4. The final stage 68B includes a first acoustic resonator 78 coupled between the second signal node 46 and the first signal node 44. The final stage 68B includes a second acoustic resonator 80 coupled to the second signal node 46, in series to the first acoustic resonator 78.

The first inherent impedance $Z_1$ is determined by a respective capacitance impedance of the first acoustic resonator 78 and the second acoustic resonator 80. In contrast, the respective capacitance impedance of the second acoustic resonator 80 determines the second inherent impedance $Z_2$. In this regard, the first inherent impedance $Z_1$ is different from the second impedance $Z_2$.

In the first mode, the control circuit 64 is configured to close the first signal switch $S_{S1}$ and open the second signal switch $S_{S2}$. Accordingly, the first inherent impedance $Z_1$ and the $R_{ON}$ of the first signal switch $S_{S1}$ present a first combined impedance at the first output node 58A. Concurrently, the control circuit 64 can couple the first multi-band filter circuit 60A to the first output node 58A, thus allowing the multi-mode RF circuit 40A to support simultaneous communication (e.g., carrier aggregation) based on the first frequency band $f_1$ and one of the frequency bands supported by the first multi-band filter circuit 60A.

In the second mode, the control circuit 64 is configured to open the first signal switch $S_{S1}$ and close the second signal switch $S_{S2}$. Accordingly, the second inherent impedance $Z_2$ and the $R_{ON}$ of the second signal switch $S_{S2}$ present a second combined impedance at the second output node 58B. Concurrently, the control circuit 64 can couple the second multi-band filter circuit 60B to the second output node 58B, thus allowing the multi-mode RF circuit 40B to support simultaneous communication (e.g., carrier aggregation) based on the second frequency band $f_2$ and one of the frequency bands supported by the second multi-band filter circuit 60B. In a non-limiting example, the first frequency band $f_1$ is identical to the second frequency band $f_2$.

Figure 7:
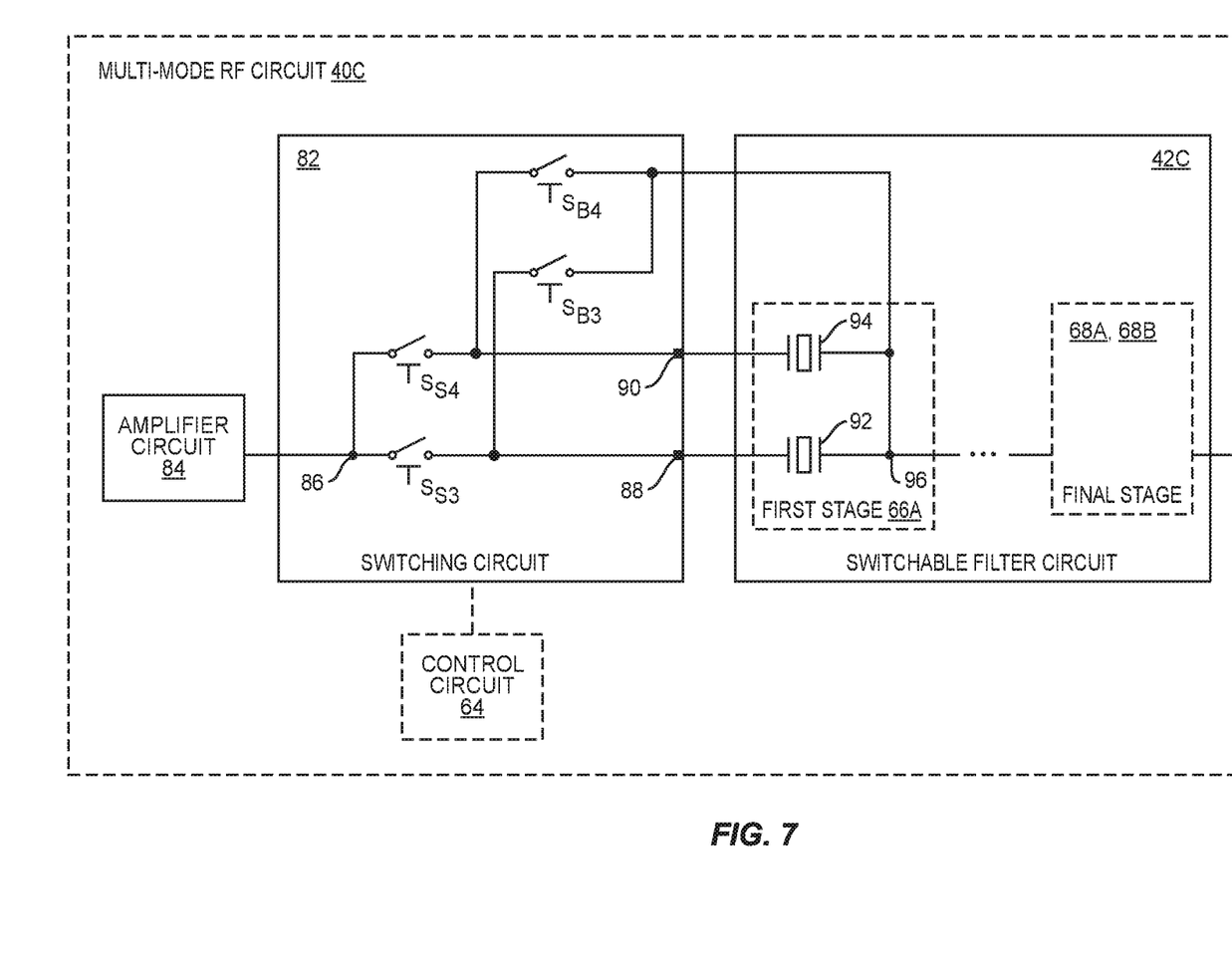
FIG. 7 is a schematic diagram of an exemplary multi-mode RF circuit configured according to another embodiment of the present disclosure.

FIG. 7 is a schematic diagram of an exemplary multi-mode RF circuit 40C configured according to one embodiment of the present disclosure. Common elements between FIGS. 5, 6, and 7 are shown therein with common element numbers and will not be re-described herein.

The multi-mode RF circuit 40C includes a second switching circuit 82, which may be coupled to an amplifier circuit 84. The second switching circuit 82 includes a third signal switch $S_{S3}$ coupled between a second common node 86 and a third output node 88. The second switching circuit 82 includes a fourth signal switch $S_{S4}$ coupled between the second common node 86 and a fourth output node 90. The second switching circuit 82 includes a third bypass switch $S_{B3}$ coupled in series to the third signal switch $S_{S3}$. The second switching circuit 82 includes a fourth bypass switch $S_{B4}$ coupled in series to the fourth signal switch $S_{S4}$.

The multi-mode RF circuit 40C includes a switchable filter circuit 42C configured according to a similar typology as the switchable filter circuit 42 of FIG. 4. In this regard, the switchable filter circuit 42C includes the intermediate stages 70(1)-70(M) of FIG. 4 (not shown) coupled to the final stage 68A or the final stage 68B. The switchable filter circuit 42C includes a first stage 66A coupled to the intermediate stages 70(1)-70(M). The first stage 66A includes a third acoustic resonator 92 and a fourth acoustic resonator 94. The third acoustic resonator 92 is coupled between the third output node 88 and a third common node 96, which may be coupled to the intermediate stages 70(1)-70(M). The fourth acoustic resonator 94 is coupled between the fourth output node 90 and the third common node 96.

The multi-mode RF circuit 40 of FIG. 3, the multi-mode RF circuit 40A of FIG. 5, and the multi-mode RF circuit 40B of FIG. 6 can be configured to transmit an RF transmit signal and receive an RF receive signal. In this regard, the switchable filter circuit 42 of FIG. 3, the switchable filter circuit 42A of FIG. 5, and the switchable filter circuit 42B of FIG. 6 can each be configured to pass an RF transmit signal in the first frequency band $f_1$ via the first signal node 44 and present the first inherent impedance $Z_1$ at the first signal node 44. Likewise, the switchable filter circuit 42 of FIG. 3, the switchable filter circuit 42A of FIG. 5, and the switchable filter circuit 42B of FIG. 6 can each be configured to pass the RF transmit signal in the second frequency band $f_2$ via the second signal node 46 and present the second inherent impedance $Z_2$ at the second signal node 46. In a first transmit mode, the control circuit 64 can be configured to couple the first input node 52 to the first output node 58A to provide the RF transmit signal to the RF front-end circuit 56 and present the first inherent impedance $Z_1$ at the first output node 58A. In a second transmit mode, the control circuit 64 can be configured to couple the second input node 54 to the second output node 58B to provide the RF transmit signal to the RF front-end circuit 56 and present the second inherent impedance $Z_2$ at the second output node 58B.

In addition, the switchable filter circuit 42 of FIG. 3, the switchable filter circuit 42A of FIG. 5, and the switchable filter circuit 42B of FIG. 6 can each be configured to pass an RF receive signal via the first signal node 44. Likewise, the switchable filter circuit 42 of FIG. 3, the switchable filter circuit 42A of FIG. 5, and the switchable filter circuit 42B of FIG. 6 can each be configured to pass the RF receive signal via the second signal node 46. In a first receive mode, the control circuit 64 can be configured to couple the first input node 52 to the first output node 58A to receive the RF receive signal from the RF front-end circuit 56. In a second receive mode, the control circuit 64 can be configured to couple the second input node 54 to the second output node 58B to receive the RF receive signal from the RF front-end circuit 56.

Those skilled in the art will recognize improvements and modifications to the preferred embodiments of the present disclosure. All such improvements and modifications are considered within the scope of the concepts disclosed herein and the claims that follow.

What is claimed is:

1. A multi-mode radio frequency (RF) circuit comprising:
a switchable filter circuit configured to:
pass an RF signal in a first frequency band and present a first inherent impedance outside the first frequency band at a first signal node; and
pass the RF signal in a second frequency band and present a second inherent impedance outside the second frequency band at a second signal node;
wherein the first inherent impedance is different from the second inherent impedance when the first frequency band is identical to the second frequency band;
a switching circuit coupled to an RF front-end circuit via at least one output node and comprising:
a first input node coupled to the first signal node; and
a second input node coupled to the second signal node; and
a control circuit configured to:
in a first mode, couple the first input node to the at least one output node to communicate the RF signal in the first frequency band via the at least one output node and present the first inherent impedance at the at least one output node; and
in a second mode, couple the second input node to the at least one output node to communicate the RF signal in the second frequency band via the at least one output node and present the second inherent impedance at the at least one output node.

2. The multi-mode RF circuit of claim 1 further comprising a multi-band filter circuit, wherein the control circuit is further configured to:
in the first mode, couple the multi-band filter circuit to the at least one output node to concurrently communicate a second RF signal outside the first frequency band; and
in the second mode, couple the multi-band filter circuit to the at least one output node to concurrently communicate the second RF signal outside the second frequency band.

3. The multi-mode RF circuit of claim 1 wherein:
the at least one output node comprises a first output node coupled to the RF front-end circuit and a second output node coupled to the RF front-end circuit; and
the control circuit is further configured to:
couple the first input node to the first output node in the first mode; and
couple the second input node to the second output node in the second mode.

4. The multi-mode RF circuit of claim 3 further comprising a first multi-band filter circuit and a second multi-band filter circuit coupled to the first output node and the second output node, respectively.

5. The multi-mode RF circuit of claim 3 wherein the switching circuit comprises:
a first signal switch coupled between the first input node and the first output node; and
a second signal switch coupled between the second input node and the second output node.

6. The multi-mode RF circuit of claim 5 wherein the first signal switch and the second signal switch are microelectromechanical systems (MEMS) switches.

7. The multi-mode RF circuit of claim 6 wherein each of the first signal switch and the second signal switch has an on-resistance less than 0.6Ω and an off-capacitance less than 64 femto-Farads (fF).

8. The multi-mode RF circuit of claim 5 wherein the switchable filter circuit comprises a first stage circuit, a final stage circuit, and one or more intermediate stage circuits coupled between the first stage circuit and the final stage circuit.

9. The multi-mode RF circuit of claim 8 wherein:
the final stage circuit in the switchable filter circuit comprises:
  a first acoustic resonator coupled between a common node and the first signal node, the first acoustic resonator configured to pass the RF signal in the first frequency band via the first signal node and present the first inherent impedance outside the first frequency band at the first signal node; and
  a second acoustic resonator coupled between the common node and the second signal node, the second acoustic resonator configured to pass the RF signal in the second frequency band via the second signal node and present the second inherent impedance outside the second frequency band at the second signal node; and
the switching circuit further comprises:
  a first bypass switch coupled between the common node and the first signal switch; and
  a second bypass switch coupled between the common node and the second signal switch.

10. The multi-mode RF circuit of claim 9 wherein the first bypass switch and the second bypass switch are MEMS switches having smaller footprints than the first signal switch and the second signal switch, respectively.

11. The multi-mode RF circuit of claim 9 wherein the control circuit is further configured to:
  in the first mode, close the first signal switch, close the second bypass switch, open the second signal switch, and open the first bypass switch; and
  in the second mode close the second signal switch, close the first bypass switch, open the first signal switch, and open the second bypass switch.

12. The multi-mode RF circuit of claim 9 wherein the first acoustic resonator is further configured to present the first inherent impedance different from the second inherent impedance presented by the second acoustic resonator when the first frequency band is identical to the second frequency band.

13. The multi-mode RF circuit of claim 9 wherein the first acoustic resonator is further configured to present the first inherent impedance identical to the second inherent impedance presented by the second acoustic resonator when the first frequency band is different from the second frequency band.

14. The multi-mode RF circuit of claim 8 wherein the final stage circuit in the switchable filter circuit comprises:
  a first acoustic resonator coupled between the second signal node and the first signal node; and
  a second acoustic resonator coupled to the second signal node.

15. The multi-mode RF circuit of claim 14 wherein the first acoustic resonator is further configured to present the first inherent impedance different from the second inherent impedance presented by the second acoustic resonator when the first frequency band is identical to the second frequency band.

16. The multi-mode RF circuit of claim 14 wherein the control circuit is further configured to:
  in the first mode, close the first signal switch and open the second signal switch; and
  in the second mode, close the second signal switch and open the first signal switch.

17. The multi-mode RF circuit of claim 8 further comprising a second switching circuit, the second switching circuit comprising:
  a third signal switch coupled between a second common node and a third output node;
  a fourth signal switch coupled between the second common node and a fourth output node;
  a third bypass switch coupled in series to the third signal switch; and
  a fourth bypass switch coupled in series to the fourth signal switch.

18. The multi-mode RF circuit of claim 17 wherein the first stage circuit in the switchable filter circuit comprises:
  a third acoustic resonator coupled between the third output node and a third common node; and
  a fourth acoustic resonator coupled between the fourth output node and the third common node.

19. The multi-mode RF circuit of claim 1 wherein:
the switchable filter circuit is configured to:
  pass an RF transmit signal in the first frequency band via the first signal node and present the first inherent impedance at the first signal node; and
  pass the RF transmit signal in the second frequency band via the second signal node and present the second inherent impedance at the second signal node; and
the control circuit is further configured to:
  in a first transmit mode, couple the first input node to the at least one output node to provide the RF transmit signal to the RF front-end circuit and present the first inherent impedance at the at least one output node; and
  in a second transmit mode, couple the second input node to the at least one output node to provide the RF transmit signal to the RF front-end circuit and present the second inherent impedance at the at least one output node.

20. The multi-mode RF circuit of claim 1 wherein:
the switchable filter circuit is configured to:
  receive an RF receive signal via the first signal node; and
  receive the RF receive signal via the second signal node; and
the control circuit is further configured to:
  in a first receive mode, couple the first input node to the at least one output node to receive the RF receive signal from the RF front-end circuit; and
  in a second receive mode, couple the second input node to the at least one output node to receive the RF receive signal from the RF front-end circuit.

21. A multi-mode radio frequency (RF) circuit comprising:
  a switchable filter circuit configured to pass an RF signal in a plurality of frequency bands and present a plurality of inherent impedances outside the plurality of frequency bands at a plurality of signal nodes, wherein the plurality of inherent impedances is different when the plurality of frequency bands is identical;
  a switching circuit coupled to an RF front-end circuit via at least one output node and comprising a plurality of input nodes coupled to the plurality of signal nodes; and
  a control circuit configured to:
  in a first mode, couple a first input node among the plurality of input nodes to the at least one output node to communicate the RF signal in a first frequency band among the plurality of frequency bands via the at least one output node and present a first inherent impedance among the plurality of inherent impedances at the at least one output node; and in a second mode, couple a second input node among the plurality of input nodes to the at least one output node to communicate the RF signal in a second frequency band among the plurality of frequency bands via the at least one output node and present a second inherent impedance among the plurality of inherent impedances at the at least one output node.

\* \* \* \* \*